May 18, 1926.
W. S. JOSEPHSON
1,584,863
GREASE GUN
Filed Jan. 28, 1924
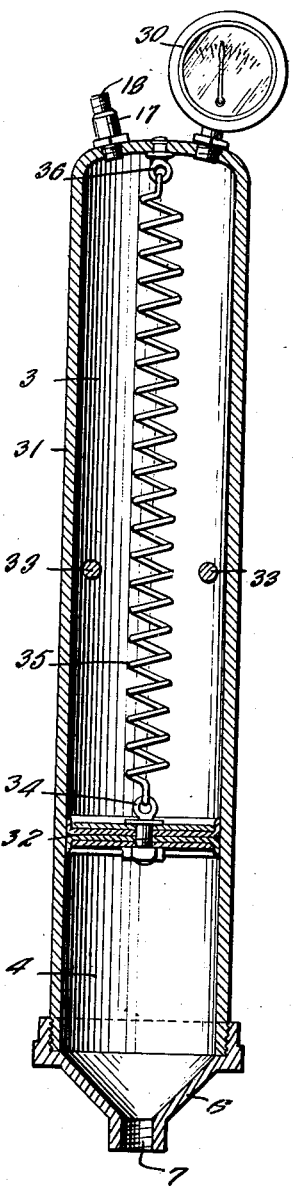
Inventor
Walter S. Josephson
By Lester L. Sargent
Attorney Patented May 18, 1926.

1,584,863

UNITED STATES PATENT OFFICE.

WALTER S. JOSEPHSON, OF BROOKLYN, NEW YORK, ASSIGNOR, BY MESNE ASSIGNMENTS, TO DRY ICE CORPORATION OF AMERICA, OF NEW YORK, N. Y., A CORPORATION OF DELAWARE.

GREASE GUN.

Application filed January 28, 1924. Serial No. 689,001.

The object of my invention is to provide certain improvements in the grease gun disclosed in my application Serial 681,204, filed December 17, 1923, whereby to provide an easy means of filling the grease gun without the necessity of soiling the hands or clothing of the operator with grease as occurs with nearly every type of grease gun now in use; and for the further object of providing an easy means for returning the piston to its starting position.

I attain these and other objects of my invention by the mechanism illustrated in the accompanying drawing, in which the figure is an axial sectional view of the device.

Referring to the drawing, there is illustrated a form of invention in which the cylinder 31, of uniform diameter throughout its length, is provided with a single piston 32 and dividing the cylinder into chambers 3 and 4. I provide a coil spring in chamber 3, which is attached at one end to an eye member 34 attached to the piston 32, and at the other end to an eye member 36, which is attached to the end of cylinder 31 farthest from its cap 6 and discharge opening 7. The coil spring 35 is attached at its ends to the eyes 34 and 36. A bottle of compresed gas can be attached to the threaded end 18 of inlet pipe 17. I provide suitable stops 33 to limit the range of travel of piston 32. Stops 33 have a function equivalent to stop lug 12 of the other form of my invention.

The filling is accomplished by the creation of a vacuum in the grease compartment 4 through the forcing up of the piston which is accomplished by the coil spring 35.

In the event that heavy grease is to be used, the cap 6 at the end of the grease chamber 4 may be removed so as to offer ample space for the inflow of the lubricant.

In order that the grease compartment 4, may be completely filled, the grease piston is permitted to travel higher than the grease line or level desired in the gun, as it is evident that a perfect vacuum will not be secured and an allowance is thus made to compensate for the imperfect vacuum.

The film of grease always on the walls of grease chambers 4 promotes the seal between the piston cup leathers or rings, as the case may be, and the cylinder walls, insuring smooth operation of the device under all conditions as it fills minute irregularities in the rim of the piston or grease chamber wall.

What I claim is:

In a grease gun, the combination of a cylinder, a piston, means for the inflow of fluid pressure to the cylinder chamber behind the piston, a spring attached to the piston and to the end of the cylinder to normally withdraw the piston to a retracted position, and a removable conical discharge nozzle forming the end of the cylinder.

WALTER S. JOSEPHSON.